(12) United States Patent
Churan

(10) Patent No.: US 8,339,308 B2
(45) Date of Patent: Dec. 25, 2012

(54) ANTENNA BEAM FORMING SYSTEMS, METHODS AND DEVICES USING PHASE ADJUSTED LEAST SQUARES BEAM FORMING

(75) Inventor: Gary G. Churan, Annandale, VA (US)

(73) Assignee: ATC Technologies LLC, Reston, VA (US)

( * ) Notice: Subject to any disclaimer, the term of this patent is extended or adjusted under 35 U.S.C. 154(b) by 359 days.

(21) Appl. No.: 12/723,823

(22) Filed: Mar. 15, 2010

(65) Prior Publication Data
US 2010/0233973 A1    Sep. 16, 2010

Related U.S. Application Data

(60) Provisional application No. 61/160,386, filed on Mar. 16, 2009.

(51) Int. Cl.
H04B 7/185    (2006.01)
H04B 1/04     (2006.01)

(52) U.S. Cl. ...................... 342/354; 455/114.2

(58) Field of Classification Search ................ 342/354; 455/114.2
See application file for complete search history.

(56) References Cited

U.S. PATENT DOCUMENTS

| | | |
|---|---|---|
| 4,901,307 A | 2/1990 | Gilhousen et al. |
| 5,073,900 A | 12/1991 | Mallinckrodt |
| 5,303,286 A | 4/1994 | Wiedeman |
| 5,339,330 A | 8/1994 | Mallinckrodt |
| 5,394,561 A | 2/1995 | Freeburg |
| 5,446,756 A | 8/1995 | Mallinckrodt |
| 5,448,623 A | 9/1995 | Wiedeman et al. |
| 5,511,233 A | 4/1996 | Otten |
| 5,555,257 A | 9/1996 | Dent |
| 5,584,046 A | 12/1996 | Martinez et al. |
| 5,612,703 A | 3/1997 | Mallinckrodt |

(Continued)

FOREIGN PATENT DOCUMENTS

EP    0 506 255 A2    9/1992

(Continued)

OTHER PUBLICATIONS

International Preliminary Report on Patentability Corresponding to International Application No. PCT/US2010/027393; Date of Mailing: Jun. 30, 2011; 8 pages.

(Continued)

*Primary Examiner* — Jack W Keith
*Assistant Examiner* — Frank J McGue
(74) *Attorney, Agent, or Firm* — Myers Bigel Sibley & Sajovec, P.A.

(57) ABSTRACT

Methods of operating a transceiver including an antenna having a plurality of antenna feed elements include providing a plurality of gain constraint values associated with respective ones of the plurality of geographic constraint points within a geographic region, selecting initial phase constraint values associated with respective ones of the gain constraint values, generating antenna feed element weights based on the gain constraint values and based on the initial phase constraint values, and determining system response values in response to the antenna feed element weights. Phases of the system response values are compared to the initial phase constraint values, and an antenna beam is formed from the antenna to the geographic region using the antenna feed element weights in response to the comparison of the phases of the system response values to the initial phase constraint values. Related systems and devices are also disclosed.

48 Claims, 6 Drawing Sheets

U.S. PATENT DOCUMENTS

| | | | |
|---|---|---|---|
| 5,619,525 A | 4/1997 | Wiedeman et al. | |
| 5,631,898 A | 5/1997 | Dent | |
| 5,761,605 A | 6/1998 | Tawil et al. | |
| 5,765,098 A | 6/1998 | Bella | |
| 5,812,947 A | 9/1998 | Dent | |
| 5,832,379 A | 11/1998 | Mallinckrodt | |
| 5,835,857 A | 11/1998 | Otten | |
| 5,848,060 A | 12/1998 | Dent | |
| 5,852,721 A | 12/1998 | Dillon et al. | |
| 5,878,329 A | 3/1999 | Mallinckrodt | |
| 5,884,142 A | 3/1999 | Wiedeman et al. | |
| 5,907,541 A | 5/1999 | Fairholm et al. | |
| 5,926,758 A | 7/1999 | Grybos et al. | |
| 5,937,332 A | 8/1999 | Karabinis | |
| 5,940,753 A | 8/1999 | Mallinckrodt | |
| 5,977,907 A * | 11/1999 | Gross | 342/354 |
| 5,991,345 A | 11/1999 | Ramasastry | |
| 5,995,832 A | 11/1999 | Mallinckrodt | |
| 6,011,951 A | 1/2000 | King et al. | |
| 6,023,605 A | 2/2000 | Sasaki et al. | |
| 6,052,560 A | 4/2000 | Karabinis | |
| 6,052,586 A | 4/2000 | Karabinis | |
| 6,067,442 A | 5/2000 | Wiedeman et al. | |
| 6,072,430 A | 6/2000 | Wyrwas et al. | |
| 6,085,094 A | 7/2000 | Vasudevan et al. | |
| 6,091,933 A | 7/2000 | Sherman et al. | |
| 6,097,752 A | 8/2000 | Wiedeman et al. | |
| 6,101,385 A | 8/2000 | Monte et al. | |
| 6,108,561 A | 8/2000 | Mallinckrodt | |
| 6,134,437 A | 10/2000 | Karabinis et al. | |
| 6,157,811 A | 12/2000 | Dent | |
| 6,157,834 A | 12/2000 | Helm et al. | |
| 6,160,994 A | 12/2000 | Wiedeman | |
| 6,169,878 B1 | 1/2001 | Tawil et al. | |
| 6,198,730 B1 | 3/2001 | Hogberg et al. | |
| 6,198,921 B1 | 3/2001 | Youssefzadeh et al. | |
| 6,201,967 B1 | 3/2001 | Goerke | |
| 6,233,463 B1 | 5/2001 | Wiedeman et al. | |
| 6,240,124 B1 | 5/2001 | Wiedeman et al. | |
| 6,253,080 B1 | 6/2001 | Wiedeman et al. | |
| 6,256,497 B1 | 7/2001 | Chambers | |
| 6,324,405 B1 | 11/2001 | Young et al. | |
| 6,339,707 B1 | 1/2002 | Wainfan et al. | |
| 6,418,147 B1 | 7/2002 | Wiedeman | |
| 6,449,461 B1 | 9/2002 | Otten | |
| 6,522,865 B1 | 2/2003 | Otten | |
| 6,628,919 B1 | 9/2003 | Curello et al. | |
| 6,684,057 B2 | 1/2004 | Karabinis | |
| 6,735,437 B2 | 5/2004 | Mayfield et al. | |
| 6,775,251 B1 | 8/2004 | Wiedeman et al. | |
| 6,785,543 B2 | 8/2004 | Karabinis | |
| 6,856,787 B2 | 2/2005 | Karabinis | |
| 6,859,652 B2 | 2/2005 | Karabinis et al. | |
| 6,879,829 B2 | 4/2005 | Dutta et al. | |
| 6,892,068 B2 | 5/2005 | Karabinis et al. | |
| 6,937,857 B2 | 8/2005 | Karabinis | |
| 6,975,837 B1 | 12/2005 | Santoru | |
| 6,999,720 B2 | 2/2006 | Karabinis | |
| 7,006,789 B2 | 2/2006 | Karabinis et al. | |
| 7,031,702 B2 | 4/2006 | Karabinis et al. | |
| 7,039,400 B2 | 5/2006 | Karabinis et al. | |
| 7,062,267 B2 | 6/2006 | Karabinis | |
| 7,092,708 B2 | 8/2006 | Karabinis | |
| 7,113,743 B2 | 9/2006 | Karabinis | |
| 7,113,778 B2 | 9/2006 | Karabinis | |
| 7,155,340 B2 | 12/2006 | Churan | |
| 7,174,127 B2 | 2/2007 | Otten et al. | |
| 7,181,161 B2 | 2/2007 | Karabinis | |
| 7,203,490 B2 | 4/2007 | Karabinis et al. | |
| 7,218,931 B2 | 5/2007 | Karabinis | |
| 7,295,807 B2 | 11/2007 | Karabinis | |
| 7,340,213 B2 | 3/2008 | Karabinis et al. | |
| 7,418,236 B2 | 8/2008 | Levin et al. | |
| 7,418,263 B2 | 8/2008 | Dutta et al. | |
| 7,421,342 B2 | 9/2008 | Churan | |
| 7,437,123 B2 | 10/2008 | Karabinis et al. | |
| 7,444,170 B2 | 10/2008 | Karabinis | |
| 7,447,501 B2 | 11/2008 | Karabinis | |
| 7,453,396 B2 | 11/2008 | Levin et al. | |
| 7,453,920 B2 | 11/2008 | Churan | |
| 7,454,175 B2 | 11/2008 | Karabinis | |
| 7,457,269 B1 | 11/2008 | Grayson | |
| 7,558,568 B2 | 7/2009 | Karabinis | |
| 7,573,945 B2 * | 8/2009 | Tesfai et al. | 375/267 |
| 7,574,206 B2 | 8/2009 | Karabinis | |
| 7,577,400 B2 | 8/2009 | Karabinis et al. | |
| 7,587,171 B2 | 9/2009 | Evans et al. | |
| 7,593,691 B2 | 9/2009 | Karabinis | |
| 7,593,724 B2 | 9/2009 | Karabinis | |
| 7,593,725 B2 | 9/2009 | Karabinis | |
| 7,593,726 B2 | 9/2009 | Karabinis et al. | |
| 7,596,111 B2 | 9/2009 | Karabinis | |
| 7,599,656 B2 | 10/2009 | Karabinis | |
| 7,603,081 B2 | 10/2009 | Karabinis | |
| 7,603,117 B2 | 10/2009 | Karabinis | |
| 7,606,590 B2 | 10/2009 | Karabinis | |
| 7,609,666 B2 | 10/2009 | Karabinis | |
| 7,620,394 B2 | 11/2009 | Good et al. | |
| 7,623,859 B2 | 11/2009 | Karabinis | |
| 7,623,867 B2 | 11/2009 | Karabinis | |
| 7,627,285 B2 | 12/2009 | Karabinis | |
| 7,634,229 B2 | 12/2009 | Karabinis | |
| 7,634,234 B2 | 12/2009 | Karabinis | |
| 7,636,546 B2 | 12/2009 | Karabinis | |
| 7,636,566 B2 | 12/2009 | Karabinis | |
| 7,636,567 B2 | 12/2009 | Karabinis et al. | |
| 7,639,981 B2 | 12/2009 | Karabinis | |
| 7,653,348 B2 | 1/2010 | Karabinis | |
| 7,664,460 B2 | 2/2010 | Karabinis et al. | |
| 7,696,924 B2 | 4/2010 | Levin et al. | |
| 7,706,746 B2 | 4/2010 | Karabinis et al. | |
| 7,706,748 B2 | 4/2010 | Dutta | |
| 7,706,826 B2 | 4/2010 | Karabinis | |
| 7,738,837 B2 | 6/2010 | Karabinis | |
| 7,747,229 B2 | 6/2010 | Dutta | |
| 7,751,823 B2 | 7/2010 | Karabinis | |
| 7,756,490 B2 | 7/2010 | Karabinis | |
| 7,783,287 B2 | 8/2010 | Karabinis | |
| 7,792,069 B2 | 9/2010 | Karabinis | |
| 7,792,488 B2 | 9/2010 | Karabinis et al. | |
| 7,796,985 B2 | 9/2010 | Karabinis | |
| 7,796,986 B2 | 9/2010 | Karabinis | |
| 7,801,520 B2 | 9/2010 | Karabinis | |
| 7,813,700 B2 | 10/2010 | Zheng et al. | |
| 7,817,967 B2 | 10/2010 | Karabinis et al. | |
| 2002/0122408 A1 | 9/2002 | Mullins | |
| 2002/0146979 A1 | 10/2002 | Regulinski et al. | |
| 2002/0177465 A1 | 11/2002 | Robinett | |
| 2003/0003815 A1 | 1/2003 | Yamada | |
| 2003/0050069 A1 * | 3/2003 | Kogiantis et al. | 455/450 |
| 2003/0149986 A1 | 8/2003 | Mayfield et al. | |
| 2004/0072539 A1 | 4/2004 | Monte et al. | |
| 2004/0102156 A1 | 5/2004 | Loner | |
| 2004/0121727 A1 | 6/2004 | Karabinis | |
| 2004/0203393 A1 | 10/2004 | Chen | |
| 2004/0240525 A1 | 12/2004 | Karabinis et al. | |
| 2005/0041619 A1 | 2/2005 | Karabinis et al. | |
| 2005/0090256 A1 | 4/2005 | Dutta | |
| 2005/0118948 A1 | 6/2005 | Karabinis et al. | |
| 2005/0136836 A1 | 6/2005 | Karabinis et al. | |
| 2005/0164700 A1 | 7/2005 | Karabinis | |
| 2005/0164701 A1 | 7/2005 | Karabinis et al. | |
| 2005/0181786 A1 | 8/2005 | Karabinis et al. | |
| 2005/0201449 A1 | 9/2005 | Churan | |
| 2005/0227618 A1 | 10/2005 | Karabinis et al. | |
| 2005/0239399 A1 | 10/2005 | Karabinis | |
| 2005/0260947 A1 | 11/2005 | Karabinis et al. | |
| 2005/0260984 A1 | 11/2005 | Karabinis | |
| 2005/0272369 A1 | 12/2005 | Karabinis et al. | |
| 2006/0040613 A1 | 2/2006 | Karabinis et al. | |
| 2006/0094420 A1 | 5/2006 | Karabinis | |
| 2006/0135058 A1 | 6/2006 | Karabinis | |
| 2006/0135070 A1 | 6/2006 | Karabinis | |
| 2006/0165120 A1 | 7/2006 | Karabinis | |
| 2006/0194576 A1 | 8/2006 | Karabinis et al. | |
| 2006/0205347 A1 | 9/2006 | Karabinis | |
| 2006/0205367 A1 | 9/2006 | Karabinis | |

| | | |
|---|---|---|
| 2006/0211452 A1 | 9/2006 | Karabinis |
| 2006/0246838 A1 | 11/2006 | Karabinis |
| 2006/0252368 A1 | 11/2006 | Karabinis |
| 2006/0292990 A1* | 12/2006 | Karabinis et al. ............ 455/63.4 |
| 2007/0010246 A1 | 1/2007 | Churan |
| 2007/0015460 A1 | 1/2007 | Karabinis et al. |
| 2007/0021059 A1 | 1/2007 | Karabinis et al. |
| 2007/0021060 A1 | 1/2007 | Karabinis et al. |
| 2007/0037514 A1 | 2/2007 | Karabinis |
| 2007/0072545 A1 | 3/2007 | Karabinis et al. |
| 2007/0092019 A1* | 4/2007 | Kotecha et al. ............... 375/267 |
| 2007/0099562 A1 | 5/2007 | Karabinis et al. |
| 2007/0123252 A1 | 5/2007 | Tronc et al. |
| 2007/0129019 A1 | 6/2007 | Otten et al. |
| 2007/0165752 A1* | 7/2007 | Warner ......................... 375/346 |
| 2007/0184849 A1 | 8/2007 | Zheng |
| 2007/0192805 A1 | 8/2007 | Dutta et al. |
| 2007/0202816 A1 | 8/2007 | Zheng |
| 2007/0243866 A1 | 10/2007 | Karabinis |
| 2007/0281612 A1 | 12/2007 | Benjamin et al. |
| 2007/0293214 A1 | 12/2007 | Ansari et al. |
| 2008/0008264 A1 | 1/2008 | Zheng |
| 2008/0032671 A1 | 2/2008 | Karabinis |
| 2008/0051080 A1* | 2/2008 | Walker et al. ................. 455/427 |
| 2008/0113666 A1 | 5/2008 | Monte et al. |
| 2008/0119190 A1 | 5/2008 | Karabinis |
| 2008/0160993 A1 | 7/2008 | Levin et al. |
| 2008/0182572 A1 | 7/2008 | Tseytlin et al. |
| 2008/0204319 A1* | 8/2008 | Niu et al. ...................... 342/368 |
| 2008/0214207 A1 | 9/2008 | Karabinis |
| 2008/0268836 A1 | 10/2008 | Karabinis et al. |
| 2009/0011704 A1 | 1/2009 | Karabinis |
| 2009/0029696 A1 | 1/2009 | Karabinis |
| 2009/0042509 A1 | 2/2009 | Karabinis et al. |
| 2009/0042516 A1 | 2/2009 | Karabinis |
| 2009/0075645 A1 | 3/2009 | Karabinis |
| 2009/0088151 A1 | 4/2009 | Karabinis |
| 2009/0137203 A1 | 5/2009 | Karabinis et al. |
| 2009/0156154 A1 | 6/2009 | Karabinis et al. |
| 2009/0170427 A1 | 7/2009 | Karabinis |
| 2009/0170428 A1 | 7/2009 | Karabinis |
| 2009/0170429 A1 | 7/2009 | Karabinis |
| 2009/0186622 A1 | 7/2009 | Karabinis |
| 2009/0231187 A1 | 9/2009 | Churan |
| 2009/0296628 A1 | 12/2009 | Karabinis |
| 2009/0305697 A1 | 12/2009 | Karabinis et al. |
| 2009/0312013 A1 | 12/2009 | Karabinis |
| 2010/0009677 A1 | 1/2010 | Karabinis et al. |
| 2010/0015971 A1 | 1/2010 | Good et al. |
| 2010/0029269 A1 | 2/2010 | Karabinis |
| 2010/0035604 A1 | 2/2010 | Dutta et al. |
| 2010/0035605 A1 | 2/2010 | Karabinis |
| 2010/0035606 A1 | 2/2010 | Karabinis |
| 2010/0039967 A1 | 2/2010 | Karabinis et al. |
| 2010/0041394 A1 | 2/2010 | Karabinis |
| 2010/0041395 A1 | 2/2010 | Karabinis |
| 2010/0041396 A1 | 2/2010 | Karabinis |
| 2010/0048201 A1 | 2/2010 | Karabinis |
| 2010/0054160 A1 | 3/2010 | Karabinis |
| 2010/0120419 A1 | 5/2010 | Zheng et al. |
| 2010/0141509 A1 | 6/2010 | Levin et al. |
| 2010/0184370 A1 | 7/2010 | Zheng et al. |
| 2010/0184381 A1 | 7/2010 | Zheng et al. |
| 2010/0184427 A1 | 7/2010 | Zheng et al. |
| 2010/0190507 A1 | 7/2010 | Karabinis et al. |
| 2010/0203828 A1 | 8/2010 | Zheng |
| 2010/0203884 A1 | 8/2010 | Zheng et al. |
| 2010/0210209 A1 | 8/2010 | Karabinis et al. |
| 2010/0210262 A1 | 8/2010 | Karabinis et al. |
| 2010/0240362 A1 | 9/2010 | Karabinis |

FOREIGN PATENT DOCUMENTS

| | | |
|---|---|---|
| EP | 0 506 255 A3 | 9/1992 |
| EP | 0 597 225 A1 | 5/1994 |
| EP | 0 506 255 B1 | 11/1996 |
| EP | 0 748 065 A2 | 12/1996 |
| EP | 0 755 163 A2 | 1/1997 |
| EP | 0 762 669 A2 | 3/1997 |
| EP | 0 762 669 A3 | 3/1997 |
| EP | 0 797 319 A2 | 9/1997 |
| EP | 0 831 599 A2 | 3/1998 |
| EP | 0 831 599 A3 | 3/1998 |
| EP | 1 059 826 A1 | 12/2000 |
| EP | 1 193 989 A1 | 4/2002 |
| EP | 1 944 885 A2 | 7/2008 |
| EP | 1 569 363 B1 | 11/2008 |
| WO | WO 01/54314 A1 | 7/2001 |
| WO | WO 2009/102486 A2 | 8/2009 |
| WO | WO 2010/056524 A1 | 5/2010 |

OTHER PUBLICATIONS

Ayyagari et al., "A satellite-augmented cellular network concept", *Wireless Networks*, Vo. 4, 1998, pp. 189-198.

Gebauer et al., "Channel-Individual Adaptive Beamforming for Mobile Satellite Communications", IEEE Journal on Selected Areas in Communications; vol. 13; Feb. 1995; No. 2, New York, NY, US; pp. 439-448; XP000489309.

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.

Notification of Transmittal of the International Search Report and The Written Opinion of the International Searching Authority, or the Declaration; International Search Report; Written Opinion of the International Searching Authority corresponding to International application No. PCT/US2010/027393; Date of mailing: Jul. 14, 2010; 16 pages.

* cited by examiner

ANTENNA BEAM FORMING SYSTEMS, METHODS AND DEVICES USING PHASE ADJUSTED LEAST SQUARES BEAM FORMING

CROSS REFERENCE TO RELATED APPLICATION

This application claims the benefit of and priority to U.S. Provisional Patent Application No. 61/160,386, filed Mar. 16, 2009, entitled "Phase-Optimized Least Squares Beam Forming," the disclosure of which is hereby incorporated herein by reference as if set forth in its entirety.

FIELD OF THE INVENTION

This invention relates to wireless communications systems and methods, and more particularly to antenna systems and methods for terrestrial and/or satellite wireless communications systems.

BACKGROUND

Beam forming refers to a technique of shaping an antenna gain pattern to improve communications using the antenna. In particular, beam forming refers to techniques for selecting complex weight coefficients ("weights") for antenna feed elements in a multi-element antenna. Signals to be transmitted from the antenna elements are multiplied by respective weights prior to transmission. Signals received by the antenna elements are multiplied by respective weights before being combined for processing.

Beam forming techniques have been applied to many modern mobile satellite systems (MSS). With multiple transmitting and receiving antenna feed elements, a satellite beam former forms a plurality of service area spot-beams (or cells) in both the forward link and the reverse link by using advanced antenna array signal processing. Beam forming can increase the average signal to noise and/or signal to interference ratio by focusing energy into desired directions in either the forward link or the reverse link. By estimating the response of each antenna element to a given user or a given location, and possible interference signals, a satellite/gateway can combine the elements with weights obtained as a function of each element response to improve the average desired signal and reduce other components, whether noise, interference or both. The spot-beams may be, for example, either fixed to an area or adaptive to particular users and/or interference environments depending, for example, on application scenarios and/or design considerations.

SUMMARY

Some embodiments provide methods of operating a transceiver including an antenna having a plurality of antenna feed elements. The methods include providing a plurality of gain constraint values associated with respective ones of the plurality of geographic constraint points within a geographic region, selecting initial phase constraint values associated with respective ones of the gain constraint values, generating antenna feed element weights based on the gain constraint values and based on the initial phase constraint values, and determining system response values in response to the antenna feed element weights. Phases of the system response values are compared to the initial phase constraint values, and an antenna beam is formed from the antenna to the geographic region using the antenna feed element weights in response to the comparison of the phases of the system response values to the initial phase constraint values, so that information may be communicated over the antenna beam.

The methods may further include iteratively adjusting the phase constraint values based on comparison of the adjusted phase constraint values with the phases of the system response values and generating adjusted antenna feed element weights and adjusted system response values in response to the gain constraint values and iteratively adjusted phase constraint values.

Iteratively generating phase constraint values and antenna feed element weights may include adjusting at least one of the phase constraint values in response to a difference between the at least one phase constraint value and a phase of a corresponding one of the system response values, and generating new antenna feed element weights in response to the adjusted phase constraint value.

The methods may further include generating a residual phase error in response to the difference between the at least one phase constraint value and the phase of the corresponding one of the system response values, and adjusting the at least one phase constraint value in response to the residual phase error being larger than a threshold value.

Adjusting the at least one phase constraint value may include rotating the at least one phase constraint value towards the phase of the corresponding one of the system response values.

Adjusting the phase constraint value may include rotating the at least one phase constraint value towards the phase of the corresponding one of the system response values by an angle equal to the difference between the at least one phase constraint value and the phase of the corresponding one of the system response values multiplied by a phase adjustment factor.

The phase adjustment factor may be a positive scalar value less than one. In some embodiments, the phase adjustment factor may be a scalar value greater than one.

Adjusting the at least one phase constraint value may be performed according to the following equation:

$$\theta_k(n+1) = \arctan\left[\frac{\sin[\theta_k(n)] + \Delta(\sin[\varphi_k(n)] - \sin[\theta_k(n)])}{\cos[\theta_k(n)] + \Delta(\cos[\varphi_k(n)] - \cos[\theta_k(n)])}\right]$$

where $\theta_k(n)$ may include the phase constraint value at geographic point k at iteration n, $\phi_k(n)$ may include the system response phase at geographic point k at iteration n, $\Delta$ may include the phase adjustment factor, and $\theta_k(n+1)$ may include the adjusted phase constraint value at geographic point k at iteration n+1.

The methods may further include generating new antenna feed element weights in response to the gain constraint values and the adjusted phase constraint values, determining the system response values based on the new antenna feed element weights, and adjusting at least one of the phase constraint values in response to a residual phase error, defined as the difference between the at least one phase constraint value and a phase of a corresponding one of the system response values.

The methods may further include repeatedly generating new antenna feed element weights and adjusted phase constraint values until the residual phase error is less than the threshold value or is deemed to have converged, or until the resulting beam patterns meet the desired beam shape, gain flatness, and/or side lobe suppression objectives.

A transceiver according to some embodiments includes an antenna having a plurality of antenna feed elements, and an electronics system including a beam former configured to provide a plurality of gain constraint values associated with respective ones of a plurality of geographic constraint points within a geographic region, to select initial phase constraint values associated with respective ones of the gain constraint values, to generate antenna feed element weights based on the gain constraint values and based on the initial phase constraint values, to determine system response values at the plurality of geographic constraint points in response to the antenna feed element weights, to compare phases of the system response values to the initial phase constraint values, and to form an antenna beam from the antenna to the geographic region using the antenna feed element weights in response to the comparison of the phases of the system response values to the initial phase constraint values.

A communications satellite according to some embodiments includes an antenna having a plurality of antenna feed elements, and an electronics system including a beam former configured to provide a plurality of gain constraint values associated with respective ones of a plurality of geographic constraint points within a geographic region, to select initial phase constraint values associated with respective ones of the gain constraint values, to generate antenna feed element weights based on the gain constraint values and based on the initial phase constraint values, to determine system response values at the plurality of geographic constraint points in response to the antenna feed element weights, to compare phases of the system response values to the initial phase constraint values, and to form an antenna beam from the antenna to the geographic region using the antenna feed element weights in response to the comparison of the phases of the system response values to the initial phase constraint values.

A satellite gateway according to some embodiments includes an electronics system including a beam former configured to provide a plurality of gain constraint values associated with respective ones of a plurality of geographic constraint points within a geographic region, to select initial phase constraint values associated with respective ones of the gain constraint values, to generate antenna feed element weights based on the gain constraint values and based on the initial phase constraint values, to determine system response values at the plurality of geographic constraint points in response to the antenna feed element weights, to compare phases of the system response values to the initial phase constraint values, to select the antenna feed element weights in response to the comparison of the phases of the system response values to the initial phase constraint values, and to transmit the antenna feed element weights to a satellite for use in forming an antenna beam from the satellite antenna to the geographic region.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION OF EMBODIMENTS

Figure 1A:
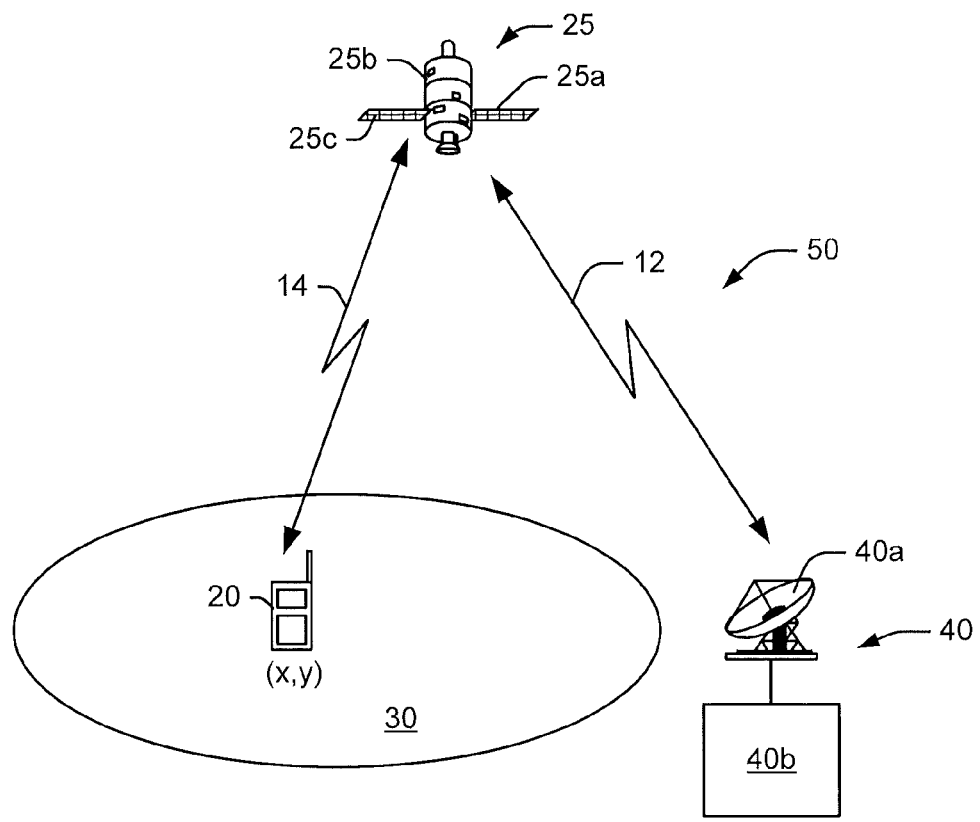
FIG. 1A illustrates exemplary communications systems/methods according to some embodiments.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

As will be appreciated by one of skill in the art, the present invention may be embodied as a method, data processing system, and/or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer usable storage medium having computer usable program code embodied in the medium. Any suitable computer readable medium may be utilized including hard disks, CD ROMs, optical storage devices, a transmission media such as those supporting the Internet or an intranet, or magnetic storage devices.

The present invention is described below with reference to flowchart illustrations and/or block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Beam forming techniques have been applied to many communications systems, including mobile satellite systems (MSS). With multiple transmitting and receiving antenna feed elements, a satellite beam former may form a plurality of service area spot-beams (or cells) in the forward link and the reverse link by using advanced antenna array signal processing. An important goal of beam forming is to increase the average signal to noise and/or signal to interference ratio of a link by focusing energy into desired directions in either the forward link or the reverse link. By estimating the response to each antenna element to a given user or a given location, and possible interference signals, a satellite/gateway can combine the elements with weights obtained as a function of each element response to improve the average desired signal and/or to reduce other components, such as noise, interference or both. The spot-beams may be, for example, either fixed to an area or adaptive to particular users and/or interference environments depending, for example, on application scenarios and/or design considerations.

A system 50 according to some embodiments of the invention is illustrated in FIG. 1A. Although embodiments are described herein in connection with satellite radio communications systems, it will be appreciated that the present invention can be embodied in other types of wireless communications systems, including terrestrial wireless communications systems, fixed and/or mobile wireless communications systems, hybrid satellite/terrestrial communications systems, etc.

Referring to FIG. 1A, a radioterminal 20 is located in a geographic cell 30 based on the geographic (x,y) coordinates of the radioterminal 20. The radioterminal 20 may comprise a mobile (handheld or vehicle mounted) or stationary transceiver or receiver. The geographic coordinates of the radioterminal 20 may be determined, for example, by a GPS processor within the radioterminal 20. The radioterminal 20 is also located within the geographic footprint of a satellite 25, which may be a low-earth orbiting satellite (LEO), a medium-earth orbiting satellite (MEO), and/or a geostationary satellite. The satellite 25, which includes an antenna 25a and an electronics system 25b, communicates with at least one satellite gateway 40, which includes an antenna 40a and an electronics system 40b via a feeder link 12. The satellite antenna 25a may include an array of antenna feed elements 25c, which generate signals covering respective overlapping geographic areas in the geographic footprint of the satellite 25.

Figure 1B:
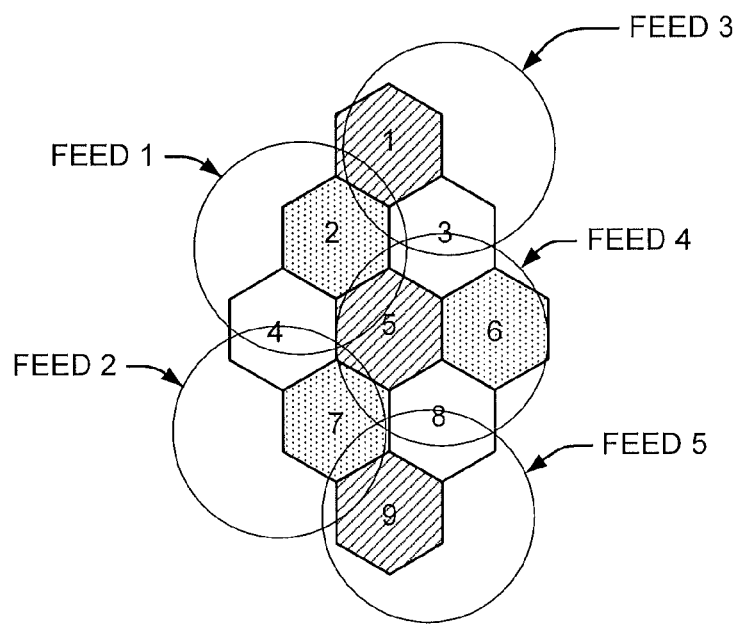
FIG. 1B schematically illustrates an exemplary footprint of five satellite forward link feed elements that are superimposed over a virtual cell configuration.

FIG. 1B schematically illustrates an exemplary footprint of five satellite forward link feed elements that are superimposed over a virtual cell configuration, assuming a frequency reuse ratio of three, for a satellite transmit beamforming system. In FIG. 1B, the idealized footprints of five antenna feed elements are transposed over nine virtual cells defined by their actual physical locations within the satellite footprint. Cells 1, 5 and 9 use a first frequency or set of frequencies, while cells 3, 4 and 8 use a second frequency or set of frequencies and cells 2, 6, and 7 use a third frequency or set of frequencies.

Figure 2:
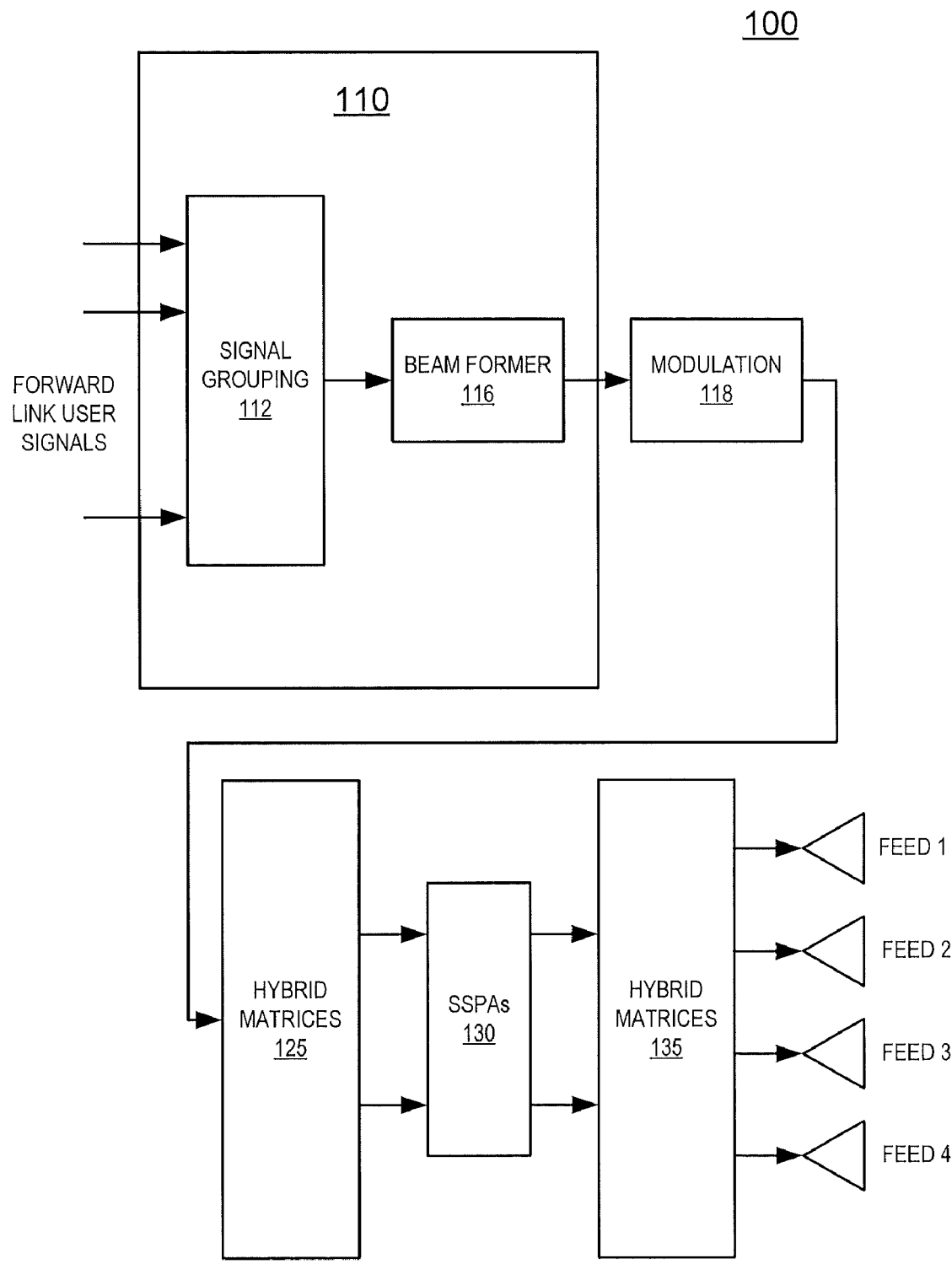
FIG. 2 illustrates a transmitter including a multiple feed antenna according to some embodiments.

A block diagram that illustrates beamforming systems and/or methods for a forward link transmitter 100 according to some embodiments of the invention is shown in FIG. 2. The transmitter 100 may be implemented, for example, in a satellite and/or in a satellite gateway.

The transmitter 100 includes a controller 110 that is configured to perform certain data processing operations on data signals that are to be transmitted by the transmitter 100. For example, the controller 110 may be configured to perform encoding, interleaving, grouping, and/or other operations. In the transmitter 100, forward link user signals are grouped into N frequency bands and are associated with subgroups of feed elements (block 112). Although four feed elements Feed 1 to Feed 4 are illustrated in FIG. 2, it will be appreciated that more or less feed elements could be employed.

Beams are formed by beam formers 116. In beamforming, complex weights are generated for each of the feed elements. Signals transmitted by the feed elements are multiplied by the respective complex weights, resulting in a desired signal gain pattern within the footprint, or geographic service region, of the antenna.

The formed beams are modulated by RF modulation (block 118) and amplified by solid state power amplifiers (SSPAs) 130, and then transmitted by each feed element Feed 1 to Feed M in parallel. In order to equalize the signal input levels applied to the individual transmit amplifiers, and therefore maintain the amplifiers within their proper signal level range, hybrid matrix amplifier configurations are commonly used onboard communication satellites. A typical hybrid matrix amplifier is comprised of a set of N ($N=2^n$, where n is an integer) parallel amplifiers located symmetrically between two, cascaded N-input by N-output multi-port hybrid matrix devices. In a typical hybrid matrix amplifier arrangement, N individual amplifier input signals are supplied by the N outputs of the N×N Input multi-port hybrid matrix 125, and the N SSPAs 130 output signals are similarly applied to the input section of the N×N Output multi-port hybrid matrix 135.

It will be appreciated that in some embodiments, the beamforming function may be performed in the electronics system 25b of the satellite 25 and/or in the electronics system 40b of the satellite gateway 40. For example, when the beam forming function for a satellite antenna is implemented in the satellite gateway 40, a beamformer in the satellite gateway 40 may generate antenna feed element weights and transmit the antenna feed element weights to the satellite 25 over the feeder link 12.

When methods such as Linearly Constrained Minimum Variance (LCMV) are used to generate beam weights from a set of complex feed element patterns, the constraint values used to define the beam constrain the phase as well as the amplitude at the geographic constraint points. For beam coverage performance, generally only the gain over the coverage area is of importance, while the phase may be less important for beam performance. However, the specified phase at each constraint point may affect the ability of the beamformer to achieve the desired gain performance. Therefore, it may be desirable to specify the constraint point phases in a manner that allows the beam gain, gain flatness, and side lobe suppression objectives to be achieved.

According to some embodiments, iterative methods are provided for calculating constraint point phase values (while maintaining their magnitudes fixed) in order to reduce a least-squares cost function that is used for generating the feed element weights. In some embodiments, iterative methods may be used to calculate optimum constraint point phase values that may minimize a least-squares cost function that is used for generating the feed element weights. The calculated constraint point values may be used to generate antenna feed element weights, and an antenna beam may be formed using the antenna feed element weights. Transmission and/or reception of information may be performed using the antenna beam.

A least-squares method may reduce, and in some cases minimize, the sum of the squared differences between a beam pattern solution and desired gain responses at a specified number of geographic constraint points. Such a method may have the advantage of being able define an unlimited number of "soft" constraint points, which may facilitate the design of shaped beams. The term "soft" emphasizes the fact that the least squares solution does not guarantee that the desired constraint values will be exactly achieved. For this reason, the number of constraint points can exceed the degrees of freedom in the system.

Figure 6:
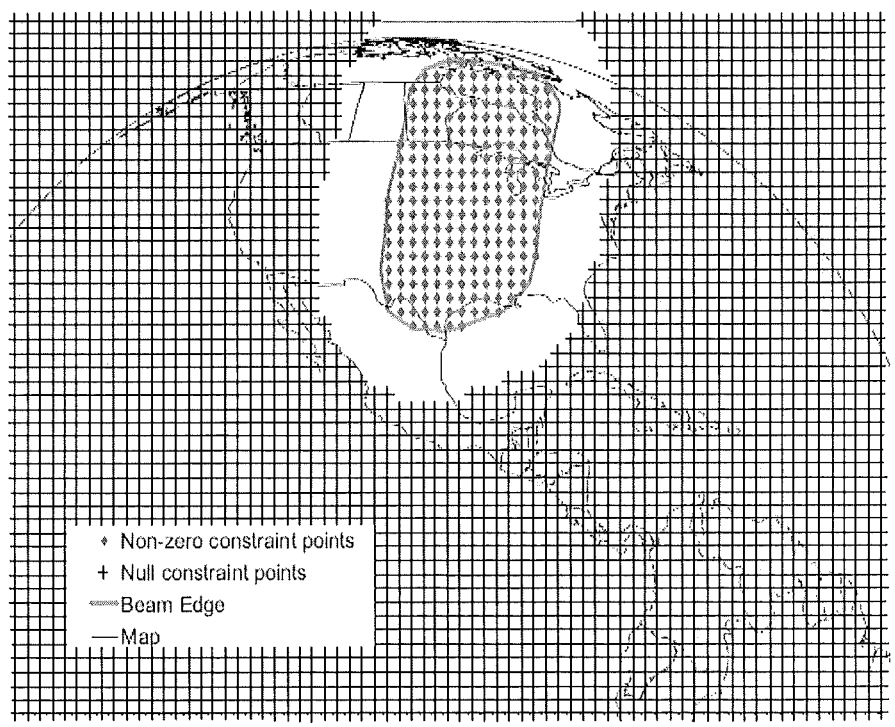
FIG. 6 illustrates exemplary constraint point placement in a geographic service area for use in methods according to some embodiments.

A multi-element antenna array may include M individual feed elements. It is desired to construct a shaped beam defined by K geographic constraint points (where K may be greater than M) in antenna azimuth/elevation coordinates, whose complex amplitudes can be zero (nulls) or non-zero (in-beam points). For example, FIG. 6 illustrates a map of North America showing a plurality of null constraint points and a plurality of non-zero constraint points for a desired beam that may be formed from a spacecraft.

Let $a^*_{mk}$ be the complex response of feed element "m" toward geographic point "k", and let $y_k$ denote the complex system response of all feed elements toward point "k". Then:

$$y_k = \sum_{m=1}^{M} a^*_{mk} w_m \qquad (1)$$

where $w_m$ is the complex beam forming weight associated with feed element "m". In matrix form:

$$y = \underline{A}^H \underline{w} \qquad (2)$$

Now let $g_k$ be the specified complex response corresponding to constraint point "k". The least-squares solution attempts to minimize the sum of squared differences between $y_k$ and $g_k$ for all k, using the following cost function:

$$\varepsilon = \sum_{k=1}^{K} c_k |y_k - g_k|^2 = \text{MIN} \qquad (3)$$

where $c_k$ is an emphasis constant (real and non-negative) assigned to each constraint point k to emphasize or deemphasize the point based on its geographic importance. Expanding equation (3) yields:

$$\varepsilon = \sum_{k=1}^{K} c_k (y_k - g_k)(y_k^* - g_k^*) \qquad (4)$$
$$= \sum_{k=1}^{K} c_k y_k y_k^* - \sum_{k=1}^{K} c_k y_k g_k^* - \sum_{k=1}^{K} c_k y_k^* g_k + \sum_{k=1}^{K} c_k |g_k|^2$$
$$= \sum_{n=1}^{M} w_n^* \sum_{m=1}^{M} w_m \sum_{k=1}^{K} c_k a_{nk} a_{mk}^* - \sum_{m=1}^{M} w_m \sum_{k=1}^{K} c_k a_{mk}^* g_k^* -$$
$$\sum_{m=1}^{M} w_m^* \sum_{k=1}^{K} c_k a_{mk} g_k + \sum_{k=1}^{K} c_k |g_k|^2$$
$$= \text{MIN}$$

Now define:

$$r_{nm} \equiv \sum_{k=1}^{K} c_k a_{nk} a_{mk}^* \qquad (5)$$

$$f_m \equiv \sum_{k=1}^{K} c_k a_{mk} g_k \qquad (6)$$

Substituting equations (5) and (6) into equation (4) yields:

$$\varepsilon = \sum_{n=1}^{M} w_n^* \sum_{m=1}^{M} w_m r_{nm} - \sum_{m=1}^{M} w_m f_m^* - \sum_{m=1}^{M} w_m^* f_m + \sum_{k=1}^{K} c_k |g_k|^2 \qquad (7)$$
$$= \text{MIN}$$

In matrix form, equation (7) can be expressed as:

$$\in = w^H \underline{R} w - f^H w - w^H f + g^H \underline{C} g = \text{MIN} \qquad (8)$$

where R is the R:(M×M) covariance matrix and f is the R:(M×1) constraint vector:

$$\underline{R} = \underline{A}\underline{C}\underline{A}^H \qquad (9)$$

$$f = \underline{A}\underline{C}g \qquad (10)$$

and where C is a R:(K×K) matrix whose main diagonal contains the emphasis constants $\{c_k\}$ and whose other elements $c_{mk}$ (m≠k) are equal to zero.

Differentiating equation (8) with respect to $w^H$ and setting the resulting terms equal to zero produces:

$$\underline{R}w = f \quad (11)$$

from which the weight vector w can be solved using the matrix inverse of $\underline{R}$:

$$w = \underline{R}^{-1} f \quad (12)$$

Note that in conventional LCMV beamforming techniques, the constraint point terms $\{g_k\}$ in the cost function (3) are specified as complex values, that is, both magnitude and phase of the beam response at the constraint points are specified. While the magnitude may be more important for defining the beam gain, the phase may be less important to the performance of the beam. However, the specified phase at each non-zero constraint point strongly affects the ability of the system to achieve optimum gain performance. Therefore, it is desirable to specify the constraint point phases in a manner that may allow the beam gain, gain flatness, and/or side lobe suppression objectives to be achieved.

Some embodiments of the present invention provide iterative methods for generating constraint point phase values that may be used in beamforming methods to reduce the least-squares cost function from which antenna weights can be generated. In some embodiments, iterative methods may be used to generate optimum constraint point phase values that may minimize a least-squares cost function used for generating the feed element weights. Furthermore, systems/methods according to some embodiments may be relatively computationally efficient, as they may include calculating a computationally intensive covariance matrix only one time.

Since we are only interested in shaping the antenna gain response, while the phase response is unimportant, an alternative cost function to equation (3) in which the phases are removed from the contributing terms is as follows:

$$\varepsilon = \sum_{k=1}^{K} c_k (|y_k| - |g_k|)^2 = \text{MIN} \quad (13)$$

That is, the alternative cost function (13) is based on the weighted sum of squared differences of the magnitudes of the system response values $y_k$ and the magnitudes of the constraint point terms $g_k$.

Evaluating equation (13) produces a non-linear solution for the weights w that cannot be solved in closed form. However, if the non-zero constraint points $\{g_k\}$ can be defined to have the same phase as their corresponding system responses $\{y_k\}$, then the cost function (3) becomes equivalent to the phase-independent cost function (13). An objective, then, is to develop a method to adjust the phases of the non-zero constraint points so they are maintained co-phase with their corresponding system responses.

The constraint point values $\{g_k\}$ may be represented in complex exponential form as follows:

$$g_k = b_k e^{j\theta_k} \quad (14)$$

where $\{b_k\}$ are the specified constraint point magnitudes, which are real and non-negative, and $\{\theta_k\}$ are the constraint point phases. The constraint point phases $\{\theta_k\}$ are treated as unknown variables to be determined.

Similarly, the complex system responses $\{y_k\}$ are also represented in complex exponential form:

$$y_k = |y_k| e^{j\phi_k} \quad (15)$$

where:

$$\phi_k = \arctan(Im\{y_k\}/Re\{y_k\}) \quad (16)$$

In addition to the cost equation (8), we now apply the following condition for each non-zero constraint point:

$$\theta_k = \phi_k \text{ (for all k where } b_k > 0) \quad (17)$$

Equations (14) through (17), along with previous expressions for y, f, and w given in equations (2), (10), and (12), respectively, can be used to produce a system of equations containing terms of the form "$\sin(\theta_m - \theta_k + \phi_k)$". However, such a system is non-linear and cannot be solved in closed form. Although the equations may be "linearized" to generate a closed-form solution, such an approach may result in degraded beam shaping performance due to the linear approximation error.

In contrast, according to some embodiments, an iterative solution for determining the constraint point phases $\{\theta_k\}$ that does not rely on linear approximations may be capable of generating a beam having a desired beam response.

Figure 3:
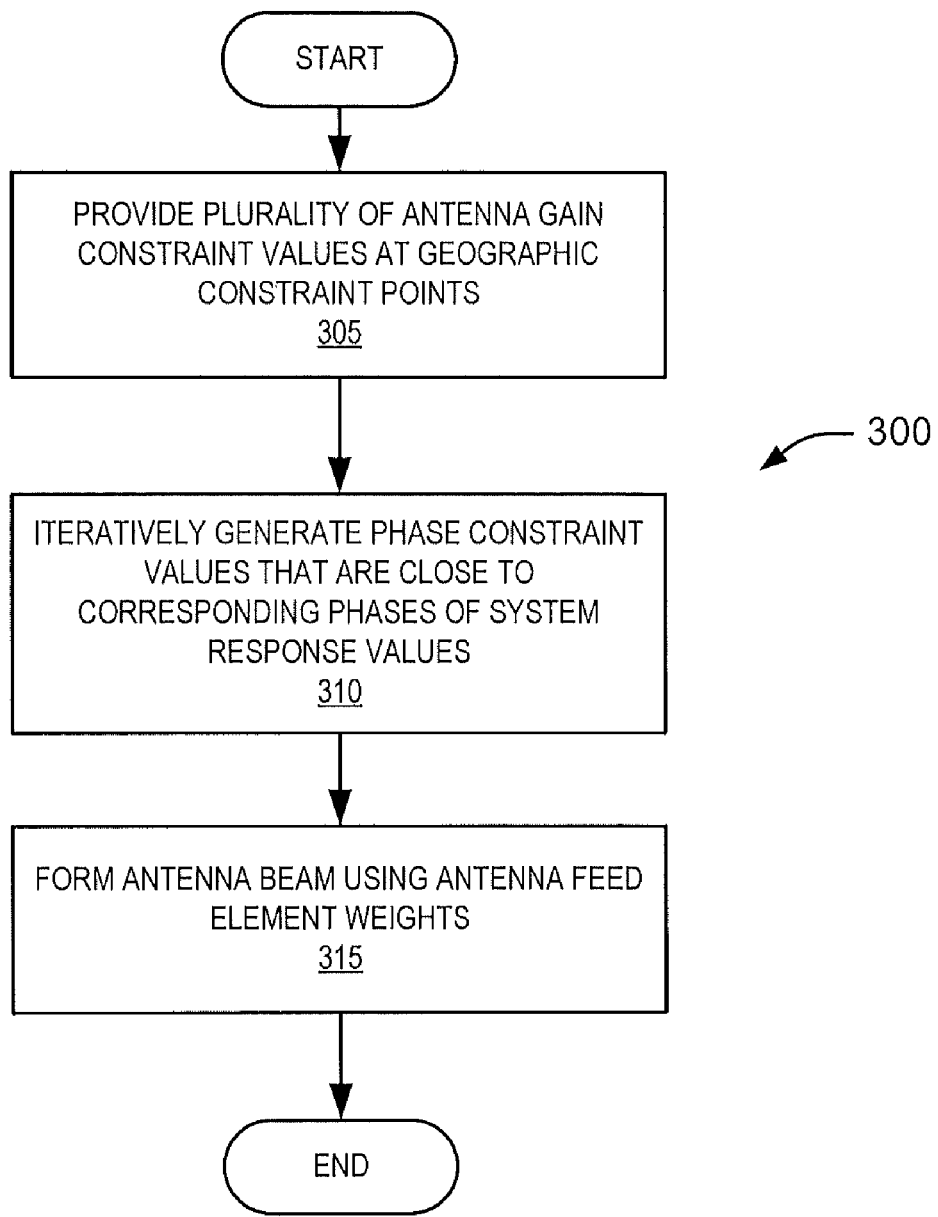
FIGS. 3 and 4 are flowcharts illustrating systems and/or methods according to some embodiments.
Figure 4:
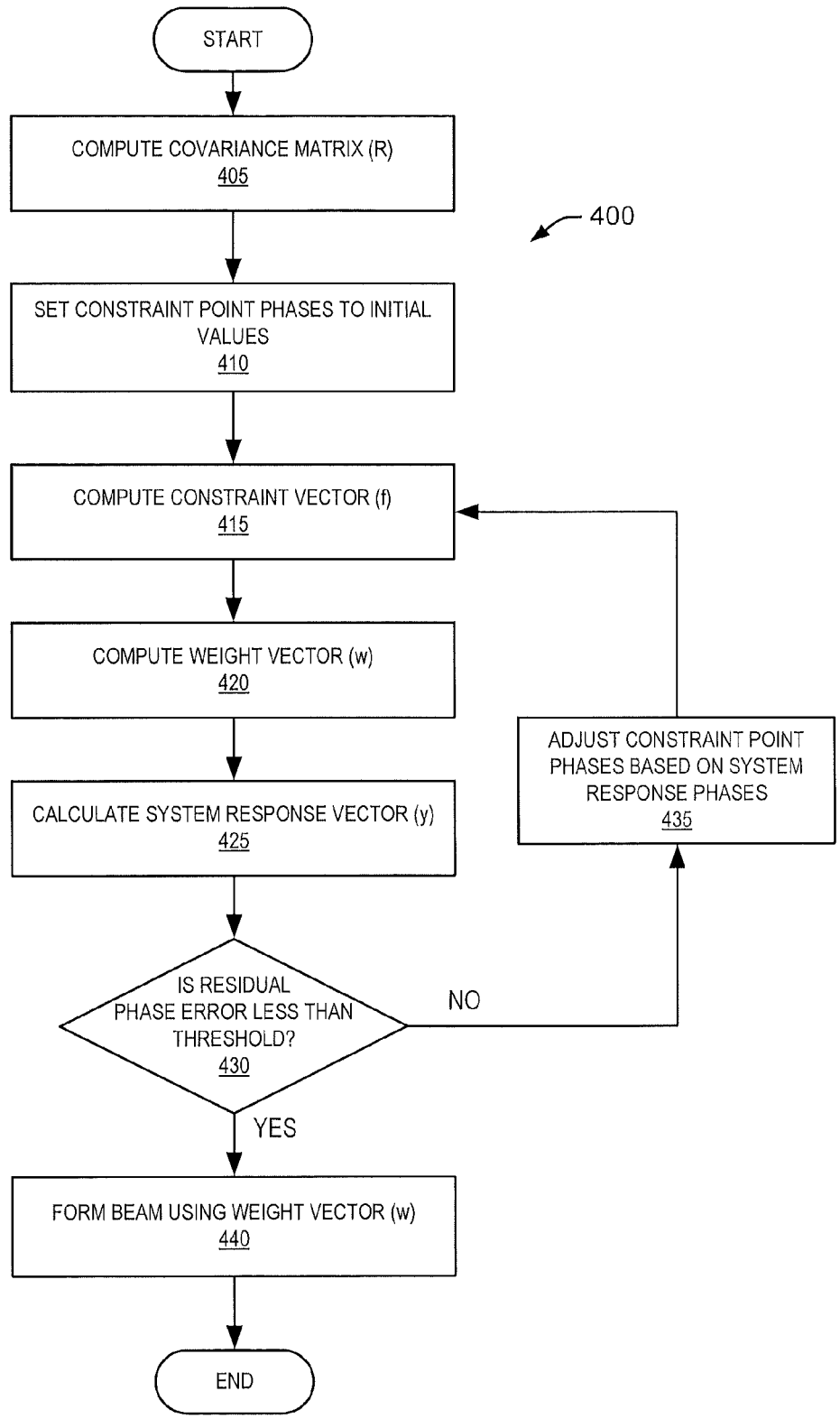

FIGS. 3 and 4 are flowcharts illustrating systems and/or methods according to some embodiments. Referring to FIG. 3, systems/methods 300 according to some embodiment provide a plurality of gain constraint values at a plurality of geographic constraint points (Block 305). The gain constraint values may be null valued or non-zero valued. The number of constraint points may be larger than the number of degrees of freedom in the system. In particular, K constraint points may be defined for an antenna having M feed elements, where K is greater than M.

Systems/methods according to some embodiments iteratively generate phase constraint values at a plurality of geographic constraint points that are equal to, or close to, corresponding phases of system response values that result from the use of antenna feed element weight values generated in response to the constraint values (Block 310). In particular, the phase constraint values may be considered to have converged when a residual phase error that results from use of the generated antenna feed element weight values is less than a threshold amount. Residual phase error may be defined as the absolute difference between the gain constraint phases $\theta_k$ and the system response phases $\phi_k$. Once the phase constraint values have converged, the resulting antenna feed element weight values are used to form a beam to/from the antenna (Block 315).

Forming an antenna beam from an M-element antenna according to some embodiments is illustrated in more detail in FIG. 4. The input parameters to systems/methods according to some embodiments are the constraint point gains, or magnitudes, $\{b_k\}$, complex feed element responses $\{a_{mk}\}$, emphasis constants $\{c_k\}$, and a scalar phase adjustment factor $\Delta$ described below.

Referring to FIG. 4, systems/methods 400 may include or be configured to perform the following operations:

First, the covariance matrix R and its inverse $\underline{R}^{-1}$ are computed using equation (9) (Block 405).

Next, the constraint point phases $\{\theta_k\}$ of the non-zero constraint points are set to initial values, such as zero (Block 410).

Using constraint point phases $\{\theta_k\}$ and specified magnitudes $\{b_k\}$, the complex constraint point values $\{g_k\}$ are then generated using equation (14) (Block 415). Null constraint point values are identically zero.

The constraint vector f is then computed from equation (10) (Block 415).

The weight vector w is then generated using equation (12) (Block 420).

The system response vector y is then generated using equation (2) (Block 425).

The system response phase values $\{\phi_k\}$ are then generated from equation (16), and compared to the constraint point phases $\{\theta_k\}$ (Block 430). If the residual phase errors $\{|\theta_k-\phi_k|\}$ are below a threshold level, or if the reduction in the residual phase errors $\{|\theta_k-\phi_k|\}$ from one iteration to the next falls below a given threshold value, the constraint point phases $\{\theta_k\}$ are deemed to have converged. The converged weight vector w is then normalized to produce the final feed element weights, and a beam may be formed using the normalized antenna feed element weights (Block 440). The residual phase error may be summed and the sum may be compared to a threshold in some embodiments. In other embodiments, the method may iterate if any of the K phase differences is greater than a threshold value. In still further embodiments, the constraint point phases $\{\theta_k\}$ may be deemed to have converged when the resulting beam patterns meet desired beam shape, gain flatness, and/or side lobe suppression objectives.

However, if the method has not converged (e.g., if the sum of the residual phase errors $\{|\theta_k-\phi_k|\}$ exceeds the threshold level), the non-zero constraint point phase values for the next iteration step are calculated by adjusting the current phases $\{\theta_k\}$ to be closer to the system response phases $\{\phi_k\}$ by an amount determined by the phase adjustment factor $\Delta$, as described in more detail below.

Operations of Blocks 415 to 435 may be repeated iteratively until the solution converges, as indicated by minimization of residual phase errors $\{|\theta_k-\phi_k|\}$ and/or reduction of the residual phase errors $\{|\theta_k-\phi_k|\}$ below the threshold level.

Figure 5:
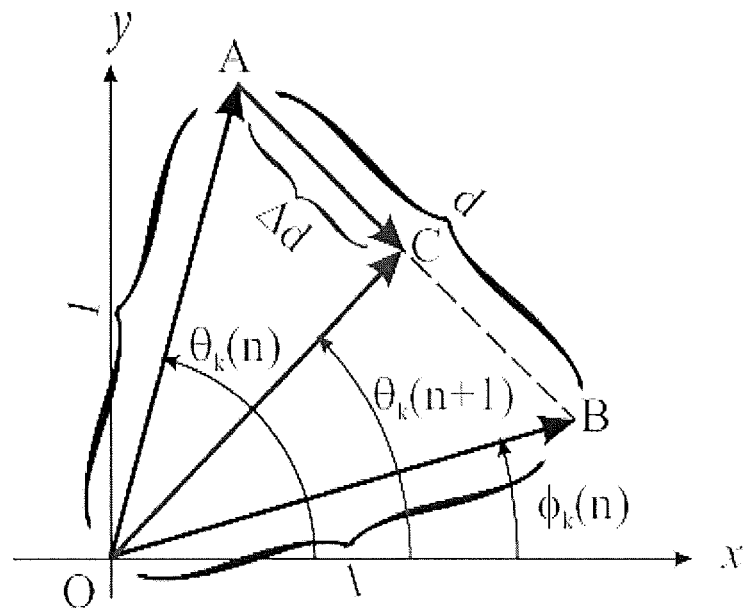
FIG. 5 illustrates iterative phase adjustment according to some embodiments.

FIG. 5 illustrates how the phase adjustment factor $\Delta$ may be applied to compute the constraint point phases for each iteration step. In FIG. 5, $\theta_k(n)$ and $\phi_k(n)$ pertain to the current phase iteration "n", while $\theta_k(n+1)$ is the adjusted phase to be used in the next iteration "n+1".

The phase adjustment factor $\Delta$ defines how much the constraint point phase $\theta_k(n+1)$ for the next iteration is adjusted from the constraint point phase $\theta_k(n)$ for the current iteration relative to the system response phase $\phi_k(n)$ for the current iteration.

In the example shown in FIG. 5, the phase adjustment factor $\Delta$ is set to 0.5, so that the constraint point phase $\theta_k(n+1)$ for the next iteration is chosen to be rotated by one half the angle between the current constraint point phase $\theta_k(n)$ and the system response phase $\phi_k(n)$.

If the phase adjustment factor $\Delta$ were set at 1.0, then the constraint point phase $\theta_k(n+1)$ for the next iteration would chosen to be equal to the current system response phase $\phi_k(n)$, i.e., $\theta_k(n+1)=\phi_k(n)$. However, doing so may not immediately lead to convergence, as the system response phase $\phi_k(n+1)$ for the next iteration may change in response to the modified constraint point phase.

A value of the phase adjustment factor $\Delta$ that is greater than 1.0 (i.e., over-adjustment) may provide faster phase convergence while still maintaining stability over all iterations. In particular, it has been found empirically that a value of the phase adjustment factor $\Delta$ that is slightly less than 2.0 may provide fastest phase convergence while still maintaining stability over all iterations.

Using the methods illustrated in FIG. 6, it can be shown that $\theta_k(n+1)$ is given by the following expression:

$$\theta_k(n+1) = \arctan\left[\frac{\sin[\theta_k(n)] + \Delta(\sin[\phi_k(n)] - \sin[\theta_k(n)])}{\cos[\theta_k(n)] + \Delta(\cos[\phi_k(n)] - \cos[\theta_k(n)])}\right] \quad (18)$$

One benefit of the iterative methods described above is that the computationally intensive calculation of the covariance matrix R and its inverse $R^{-1}$ may be performed only once at the beginning of the process. Subsequent iterations over $\{\theta_k\}$ require no matrix inversions, and can therefore be calculated with relatively few computations.

Figure 7:
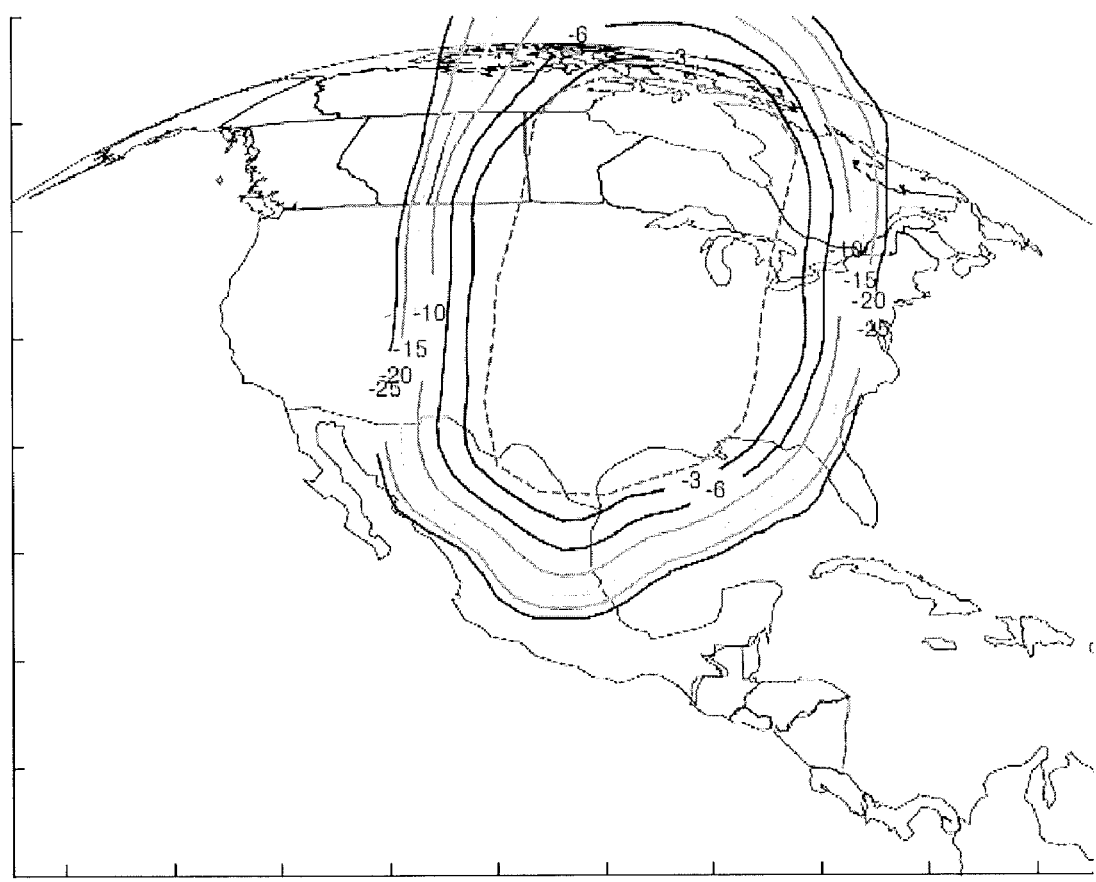
FIG. 7 illustrates beam gain contours (in dB) generated using a method according to some embodiments.

The design of a regional beam using a phase-adjusted least-squares method according to some embodiments was simulated using the placement of null and non-zero constraint points as shown in FIG. 6. Note that the number of constraint points is not mathematically limited; thus, as many constraint points as desired may be defined. FIG. 7 shows the resulting beam contour pattern (in dB), which exhibits high in-beam gain flatness, fast beam-edge roll-off, and good side lobe suppression.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A method of operating a transceiver including an antenna having a plurality of antenna feed elements, comprising:
   providing a plurality of gain constraint values, each of which is associated with a respective one of a plurality of geographic constraint points within a geographic region;
   selecting initial phase constraint values associated with respective ones of the plurality of gain constraint values;
   generating antenna feed element weights based on the plurality of gain constraint values and based on the initial phase constraint values;
   determining system response values in response to the antenna feed element weights;
   comparing phases of the system response values to the initial phase constraint values;
   forming an antenna beam from the antenna to the geographic region using the antenna feed element weights in response to the comparison of the phases of the system response values to the initial phase constraint values; and
   communicating information over the antenna beam.

2. The method of claim 1, further comprising iteratively adjusting the phase constraint values based on comparison of the adjusted phase constraint values with the phases of the system response values and generating adjusted antenna feed element weights and adjusted system response values in response to the gain constraint values and the iteratively adjusted phase constraint values.

3. The method of claim 2, wherein iteratively generating phase constraint values and antenna feed element weights comprises adjusting at least one of the phase constraint values in response to a difference between the at least one phase constraint value and a phase of a corresponding one of the system response values, and generating new antenna feed element weights in response to the adjusted phase constraint value.

4. The method of claim 3, further comprising generating a residual phase error in response to the difference between the at least one phase constraint value and the phase of the corresponding one of the system response values, and adjusting the at least one phase constraint value in response to the residual phase error being larger than a threshold value.

5. The method of claim 4, wherein adjusting the at least one phase constraint value comprises rotating the at least one phase constraint value towards the phase of the corresponding one of the system response values.

6. The method of claim 5, wherein adjusting the phase constraint value comprises rotating the at least one phase constraint value towards the phase of the corresponding one of the system response values by an angle equal to the difference between the at least one phase constraint value and the phase of the corresponding one of the system response values multiplied by a phase adjustment factor.

7. The method of claim 6, wherein the phase adjustment factor is a positive scalar value less than one.

8. The method of claim 6, wherein the phase adjustment factor is a scalar value greater than one.

9. The method of claim 6, wherein adjusting the at least one phase constraint value is performed according to the following equation:

$$\theta_k(n+1) = \arctan\left[\frac{\sin[\theta_k(n)] + \Delta(\sin[\varphi_k(n)] - \sin[\theta_k(n)])}{\cos[\theta_k(n)] + \Delta(\cos[\varphi_k(n)] - \cos[\theta_k(n)])}\right]$$

where $\theta_k(n)$ comprises the phase constraint value at geographic point k at iteration n, $\varphi_k(n)$ comprises the system response phase at geographic point k at iteration n, $\Delta$ comprises the phase adjustment factor, and $\theta_k(n+1)$ comprises the adjusted phase constraint value at geographic point k at iteration n+1.

10. The method of claim 4, further comprising:
generating new antenna feed element weights in response to the gain constraint values and the adjusted phase constraint values, determining the system response values based on the new antenna feed element weights, and adjusting at least one of the phase constraint values in response to a difference between the at least one phase constraint value and a phase of a corresponding one of the system response values.

11. The method of claim 10, further comprising:
repeatedly generating new antenna feed element weights and adjusted phase constraint values until the residual phase error is less than the threshold value.

12. The method of claim 10, further comprising:
repeatedly generating new antenna feed element weights and adjusted phase constraint values until the residual phase error has converged according to a predetermined convergence criterion.

13. A transceiver, comprising:
an antenna having a plurality of antenna feed elements; and
an electronics system including a beam former configured to provide a plurality of gain constraint values, each of which is associated with a respective one of a plurality of geographic constraint points within a geographic region, to select initial phase constraint values associated with respective ones of the plurality of gain constraint values, to generate antenna feed element weights based on the plurality of gain constraint values and based on the initial phase constraint values, to determine system response values at the plurality of geographic constraint points in response to the antenna feed element weights, to compare phases of the system response values to the initial phase constraint values, and to form an antenna beam from the antenna to the geographic region using the antenna feed element weights in response to the comparison of the phases of the system response values to the initial phase constraint values.

14. The transceiver of claim 13, wherein the beam former is configured to iteratively adjust the phase constraint values based on comparison of the adjusted phase constraint values with the phases of the system response values and generate adjusted antenna feed element weights and adjusted system response values in response to the gain constraint values and the iteratively adjusted phase constraint values.

15. The transceiver of claim 14, wherein the beam former is configured to iteratively generate the phase constraint values and antenna feed element weights by adjusting at least one of the phase constraint values in response to a difference between the at least one phase constraint value and a phase of a corresponding one of the system response values, and configured to generate new antenna feed element weights in response to the adjusted phase constraint value.

16. The transceiver of claim 15, wherein the beam former is further configured to generate a residual phase error in response to the difference between the at least one phase constraint value and the phase of the corresponding one of the system response values, and to adjust the at least one phase constraint value in response to the residual phase error being larger than a threshold value.

17. The transceiver of claim 16, wherein the beam former is further configured to adjust the at least one phase constraint value by rotating the at least one phase constraint value towards the phase of the corresponding one of the system response values.

18. The transceiver of claim 17, wherein the beam former is further configured to adjust the phase constraint value by rotating the at least one phase constraint value towards the phase of the corresponding one of the system response values by an angle equal to the difference between the at least one phase constraint value and the phase of the corresponding one of the system response values multiplied by a phase adjustment factor.

19. The transceiver of claim 18, wherein the phase adjustment factor is a positive scalar value less than one.

20. The transceiver of claim 18, wherein the phase adjustment factor is a scalar value greater than one.

21. The transceiver of claim 18, wherein the beam former is further configured to adjust the at least one phase constraint value according to the following equation:

$$\theta_k(n+1) = \arctan\left[\frac{\sin[\theta_k(n)] + \Delta(\sin[\varphi_k(n)] - \sin[\theta_k(n)])}{\cos[\theta_k(n)] + \Delta(\cos[\varphi_k(n)] - \cos[\theta_k(n)])}\right]$$

where $\theta_k(n)$ comprises the phase constraint value at geographic point k at iteration n, $\varphi_k(n)$ comprises the system response phase at geographic point k at iteration n, $\Delta$ comprises the phase adjustment factor, and $\theta_k(n+1)$ comprises the adjusted phase constraint value at geographic point k at iteration n+1.

22. The transceiver of claim 16, wherein the beam former is further configured to generate new antenna feed element weights in response to the gain constraint values and the adjusted phase constraint values, determine the system response values based on the new antenna feed element weights, and adjust at least one of the phase constraint values in response to a difference between the at least one phase constraint value and a phase of a corresponding one of the system response values.

23. The transceiver of claim 22, wherein the beam former is further configured to repeatedly generate new antenna feed element weights and adjusted phase constraint values until the residual phase error is less than the threshold value.

24. The transceiver of claim 22, wherein the beam former is further configured to repeatedly generate new antenna feed element weights and adjusted phase constraint values until the residual phase error has converged according to a predetermined convergence criterion.

25. A communications satellite, comprising:
an antenna having a plurality of antenna feed elements; and
an electronics system including a beam former configured to provide a plurality of gain constraint values, each of which is associated with a respective one of a plurality of geographic constraint points within a geographic region, to select initial phase constraint values associated with respective ones of the plurality of gain constraint values, to generate antenna feed element weights based on the plurality of gain constraint values and based on the initial phase constraint values, to determine system response values at the plurality of geographic constraint points in response to the antenna feed element weights, to compare phases of the system response values to the initial phase constraint values, and to form an antenna beam from the antenna to the geographic region using the antenna feed element weights in response to the comparison of the phases of the system response values to the initial phase constraint values.

26. The communications satellite of claim 25, wherein the beam former is configured to iteratively adjust the phase constraint values based on comparison of the adjusted phase constraint values with the phases of the system response values and generate adjusted antenna feed element weights and adjusted system response values in response to the gain constraint values and the iteratively adjusted phase constraint values.

27. The communications satellite of claim 26, wherein the beam former is configured to iteratively generate the phase constraint values and antenna feed element weights by adjusting at least one of the phase constraint values in response to a difference between the at least one phase constraint value and a phase of a corresponding one of the system response values, and configured to generate new antenna feed element weights in response to the adjusted phase constraint value.

28. The communications satellite of claim 27, wherein the beam former is further configured to generate a residual phase error in response to the difference between the at least one phase constraint value and the phase of the corresponding one of the system response values, and to adjust the at least one phase constraint value in response to the residual phase error being larger than a threshold value.

29. The communications satellite of claim 28, wherein the beam former is further configured to adjust the at least one phase constraint value by rotating the at least one phase constraint value towards the phase of the corresponding one of the system response values.

30. The communications satellite of claim 29, wherein the beam former is further configured to adjust the phase constraint value by rotating the at least one phase constraint value towards the phase of the corresponding one of the system response values by an angle equal to the difference between the at least one phase constraint value and the phase of the corresponding one of the system response values multiplied by a phase adjustment factor.

31. The communications satellite of claim 30, wherein the phase adjustment factor is a positive scalar value less than one.

32. The communications satellite of claim 30, wherein the phase adjustment factor is a scalar value greater than one.

33. The communications satellite of claim 30, wherein the beam former is further configured to adjust the at least one phase constraint value according to the following equation:

$$\theta_k(n+1) = \arctan\left[\frac{\sin[\theta_k(n)] + \Delta(\sin[\varphi_k(n)] - \sin[\theta_k(n)])}{\cos[\theta_k(n)] + \Delta(\cos[\varphi_k(n)] - \cos[\theta_k(n)])}\right]$$

where $\theta_k(n)$ comprises the phase constraint value at geographic point k at iteration n, $\phi_k(n)$ comprises the system response phase at geographic point k at iteration n, $\Delta$ comprises the phase adjustment factor, and $\theta_k(n+1)$ comprises the adjusted phase constraint value at geographic point k at iteration n+1.

34. The communications satellite of claim 28, wherein the beam former is further configured to generate new antenna feed element weights in response to the gain constraint values and the adjusted phase constraint values, determine the system response values based on the new antenna feed element weights, and adjust at least one of the phase constraint values in response to a difference between the at least one phase constraint value and a phase of a corresponding one of the system response values.

35. The communications satellite of claim 34, wherein the beam former is further configured to repeatedly generate new antenna feed element weights and adjusted phase constraint values until the residual phase error is less than the threshold value.

36. The communications satellite of claim 34, wherein the beam former is further configured to repeatedly generate new antenna feed element weights and adjusted phase constraint values until the residual phase error has converged according to a predetermined convergence criterion.

37. A satellite gateway, comprising:
an electronics system including a beam former configured to provide a plurality of gain constraint values, each of which is associated with a respective one of a plurality of geographic constraint points within a geographic region, to select initial phase constraint values associated with respective ones of the plurality of gain constraint values, to generate antenna feed element weights based on the plurality of gain constraint values and based on the initial phase constraint values, to determine system response values at the plurality of geographic constraint points in response to the antenna feed element weights, to compare phases of the system response values to the initial phase constraint values, to select the antenna feed element weights in response to the comparison of the phases of the system response values to the initial phase constraint values, and to transmit the antenna feed element weights to a satellite for use in forming an antenna beam from the satellite antenna to the geographic region.

38. The satellite gateway of claim 37, wherein the beam former is configured to iteratively adjust the phase constraint values based on comparison of the adjusted phase constraint values with the phases of the system response values and generate adjusted antenna feed element weights and adjusted system response values in response to the gain constraint values and the iteratively adjusted phase constraint values.

39. The satellite gateway of claim 38, wherein the beam former is configured to iteratively generate the phase constraint values and antenna feed element weights by adjusting at least one of the phase constraint values in response to a difference between the at least one phase constraint value and a phase of a corresponding one of the system response values, and configured to generate new antenna feed element weights in response to the adjusted phase constraint value.

40. The satellite gateway of claim 39, wherein the beam former is further configured to generate a residual phase error in response to the difference between the at least one phase constraint value and the phase of the corresponding one of the system response values, and to adjust the at least one phase constraint value in response to the residual phase error being larger than a threshold value.

41. The satellite gateway of claim 40, wherein the beam former is further configured to adjust the at least one phase constraint value by rotating the at least one phase constraint value towards the phase of the corresponding one of the system response values.

42. The satellite gateway of claim 41, wherein the beam former is further configured to adjust the phase constraint value by rotating the at least one phase constraint value towards the phase of the corresponding one of the system response values by an angle equal to the difference between the at least one phase constraint value and the phase of the corresponding one of the system response values multiplied by a phase adjustment factor.

43. The satellite gateway of claim 42, wherein the phase adjustment factor is a positive scalar value less than one.

44. The satellite gateway of claim 42, wherein the phase adjustment factor is a scalar value greater than one.

45. The satellite gateway of claim 42, wherein the beam former is further configured to adjust the at least one phase constraint value according to the following equation:

$$\theta_k(n+1) = \arctan\left[\frac{\sin[\theta_k(n)] + \Delta(\sin[\varphi_k(n)] - \sin[\theta_k(n)])}{\cos[\theta_k(n)] + \Delta(\cos[\varphi_k(n)] - \cos[\theta_k(n)])}\right]$$

where $\theta_k(n)$ comprises the phase constraint value at geographic point k at iteration n, $\phi_k(n)$ comprises the system response phase at geographic point k at iteration n, $\Delta$ comprises the phase adjustment factor, and $\theta_k(n+1)$ comprises the adjusted phase constraint value at geographic point k at iteration n+1.

46. The satellite gateway of claim 40, wherein the beam former is further configured to generate new antenna feed element weights in response to the gain constraint values and the adjusted phase constraint values, determine the system response values based on the new antenna feed element weights, and adjust at least one of the phase constraint values in response to a difference between the at least one phase constraint value and a phase of a corresponding one of the system response values.

47. The satellite gateway of claim 46, wherein the beam former is further configured to repeatedly generate new antenna feed element weights and adjusted phase constraint values until the residual phase error is less than the threshold value.

48. The satellite gateway of claim 46, wherein the beam former is further configured to repeatedly generate new antenna feed element weights and adjusted phase constraint values until the residual phase error has converged according to a predetermined convergence criterion.

* * * * *